United States Patent [19]

Hughes et al.

[11] Patent Number: 4,714,749

[45] Date of Patent: Dec. 22, 1987

[54] FULLY SATURATED PETROLEUM RESIN AND HOT MELT PRESSURE SENSITIVE ADHESIVE FORMULATIONS UTILIZING SAME AS TACKIFIER

[75] Inventors: Vincent L. Hughes; Ralph W. Looney, both of Baton Rouge, La.

[73] Assignee: Exxon Research & Engineering Co., Florham Park, N.J.

[21] Appl. No.: 918,616

[22] Filed: Oct. 10, 1986

Related U.S. Application Data

[63] Continuation of Ser. No. 511,518, Jul. 7, 1983, abandoned.

[51] Int. Cl.⁴ .............................................. C08F 10/14
[52] U.S. Cl. ...................................... 526/290; 525/98; 525/332.1; 525/332.8
[58] Field of Search ............... 526/290; 525/98, 332.1, 525/332.8

[56] References Cited

U.S. PATENT DOCUMENTS

| | | | |
|---|---|---|---|
| 3,325,430 | 6/1967 | Grasley | 525/98 |
| 3,554,940 | 1/1971 | Arakawa et al. | 526/290 |
| 4,011,387 | 3/1977 | Curts et al. | 525/98 |
| 4,038,346 | 7/1977 | Feeney | 525/98 |
| 4,113,930 | 9/1978 | Moczygemba | 525/332.1 |
| 4,157,363 | 6/1979 | Hepworth | 525/98 |
| 4,286,077 | 8/1981 | St. Clair et al. | 525/98 |

FOREIGN PATENT DOCUMENTS 001306  4/1979  European Pat. Off. .

Primary Examiner—Paul R. Michl
Assistant Examiner—Alex H. Walker
Attorney, Agent, or Firm—J. F. Hunt

[57] ABSTRACT

This invention relates to pressure sensitive adhesive formulations which include a saturated midblock thermoplastic elastomer such as a block copolymer of polystyrene and hydrogenated polydiene such as Kraton ® G and a fully saturated tackifying resin derived from petroleum feedstock polymerized in the presence of aluminum chloride and having a Mn ranging from 400 to 800, a softening point of 40° to 70° C. and a glass transition temperature less than 45° C. whereby the adhesive formulations have a rolling ball tack of less than 10 cm., a 180° peel of from 1 to 4 pounds per inch, a 90° quick stick of from 0.5 to 2.0 pounds per inch and a Polyken probe tack of higher than 400 g/cm² with a formulation containing 100 to 180 phr of the saturated tackifying resin.

7 Claims, No Drawings

FULLY SATURATED PETROLEUM RESIN AND HOT MELT PRESSURE SENSITIVE ADHESIVE FORMULATIONS UTILIZING SAME AS TACKIFIER

This is a continuation of application Ser. No. 511,518 filed July 7, 1983, now abandoned.

This invention relates to a petroleum resin having excellent tackifying properties for a saturated midblock thermoplastic elastomer. More particularly, it relates to a saturated, water white petroleum resin having a number average molecular weight of from 400 to 800, a softening point from 40° C. to 70° C. and a glass transition temperature of less than 45° C. whereby said resin can provide the requisite tackification of pressure sensitive adhesives containing a block copolymer of styrene and hydrogenated polydiene and hot melt pressure sensitive adhesive compositions of both the solution cast and hot melt application types containing said resin and said block copolymer.

BACKGROUND OF THE INVENTION

Broadly speaking, adhesives can be classified into three categories: water based; solvent based and hot melt adhesives. In the case of water based or solvent based adhesives, energy from the outside, in some fashion, is applied to the system to evaporate the water or the solvent in order that an adhesive layer may be formed. For the solvent based types, the requisite evaporation of the solvent also introduces the solvent into the environment which both requires energy and can be deleterious to the surrounding environment. Costly solvent recovery equipment is then required to control pollution. It is for these reasons that hot melt pressure sensitive adhesives (hereinafter called HMPSA) are highly desirable since the elimination of water and solvent leads to a lower energy requirement to form the adhesive layer with hot melt systems.

The key requirement for a HMPSA is that it should have good cohesive and tackifying properties at ambient conditions. The adhesive should also have good flow characteristics if it is to be used in the bulk state, otherwise it should possess sufficient consistency when dissolved in suitable cosolvents so that it can be coated or sprayed on the surfaces to be bonded or the backing used to form a tape or label. Usually the HMPSA is prepared from a mixture of tackifying resin, polymer and possibly a plasticizer (when required to soften the adhesive and enhance the aggressive tack).

Certain commercial block copolymers such as a Shell's Kraton ® are widely used as the polymer in HMPSA. The adhesives prepared from blends incorporating these polymers have very good adhesive and strength properties at room temperature and can be processed by conventional melt coating and extrusion techniques because of their good flow characteristics. Because of this excellent combination of properties exhibited by the ABA type of block copolymer when B represents a polydiene or a polyolefin block and A represents a polystyrene block, e.g. a thermoplastic elastomer, the use of such polymers for various HMPSA applications is growing in the industry.

However, these referenced block copolymers when used in combination with known tackifying resins for HMPSA blends have a serious drawback when blended with a major proportion of resin. Under this condition in order to realize the tackifying properties of the petroleum resin component of the blend, it is necessary to incorporate substantial levels of a plasticizer, usually a naphthenic oil or a liquid resin whereby the aggressiveness of tack and other requisite properties of these tertiary blends can be controlled. The use of plasticizers results in a number of deleterious effects on the using of HMPSA compositions including long term degradation of adhesion.

The petroleum resins generally used as tackifiers for Kraton ® type block copolymers include those produced according to the teachings of U.S. Pat. No. 3,577,398 wherein the polymeric resinous composition is obtained from the polymerization of a feedstock containing a mixture of piperylene, i.e. pentadiene-1,3 and 2-methyl-2-butene in the presence of anhydrous particulate aluminum chloride and a hydrocarbon diluent. The resinous products are reported as having softening points of about 80° C. to about 110° C. (col. 2, line 62) although upon steam stripping the softening points are raised to a range of about 90° C. to about 110° C. (col. 2, lines 69–70). Unfortunately, as indicated above, the use of a major proportion of such a resin as a tackifier for Kraton ® type block copolymers requires from 5 to 30 weight percent of plasticizer in the tertiary blend to provide a useful pressure sensitive adhesive composition. Even more critical is the general unsuitability of such a tackifying resin for water-white saturated midblock thermoplastic elastomers since these resins are colored (not water-white) and have detrimental thermal and ultra-violet light stability.

It is an object of this invention to provide an improved petroleum resin for tackification of pressure sensitive adhesive blends containing a saturated mid block thermoplastic elastomer.

STATEMENT OF THE INVENTION

It has been discovered that the polymerization of a $C_5$ fraction feedstock having a major proportion of a mixture of piperylene and 2-methyl butenes with a total diolefin to monoolefin weight ratio of about 0.47, a total diolefin to 2-methyl butenes weight ratio of about 0.9 and a total cyclic diolefin to monoolefin ratio of about 0.02 in the presence of 1.5 weight percent particulate aluminum chloride produces a petroleum resin having a weight average molecular weight ($\overline{M}w$) of 800 to 960, a number average molecular weight ($\overline{M}n$) of 500 to 600 and a ($\overline{M}w$)/($\overline{M}n$) ratio of at least 1.3, which upon hydrogenation to saturation provided a water-white resin having a softening point of about 57° C. and a glass transition temperature of about 20° C. which in a binary blend with a ABA block copolymer of polystyrene hydrogenated polydiene-polystyrene provided a useful HMPSA composition. Both ($\overline{M}w$) and ($\overline{M}n$) are measured by gel permeation chromatography using a polyisobutylene standard and the glass transition temperature (Tg) is a thermal measurement using a differential scanning calorimeter (DuPont Instruments Model 990).

Thus in accordance with this invention, there is provided a fully saturated petroleum resin possessing in its backbone structure a preponderance of substituted cyclohexane rings and having a number average molecular weight ($\overline{M}n$) of from 400 to 800, a softening point of 40° to 70° C., a glass transition temperature (Tg) of less than 45° C. and when admixed at the total weight level of 60% with Kraton ® G 1657, a saturated midblock thermoplastic elastomer, provides a HMPSA having a rolling ball tack of less than 10 cm and a Polyken probe tack greater than 400 gm/cm$^2$.

The petroleum resin of this invention makes possible in a binary blend a pressure sensitive adhesive formulation which comprises (a) a saturated mid-block thermoplastic elastomer preferably composed of polystyrene blocks and a hydrogenated polydiene block and (b) a fully saturated petroleum resin possessing in its backbone structure a preponderance of substituted cyclohexane rings and having a number average molecular weight (Mn) of from 400 to 800, a softening point of 40° to 70° C., a glass transition temperature (Tg) of less than 45° C. and when admixed at the total weight level of 60% with Kraton ® G 1657, a saturated midblock thermoplastic elastomer and coated to a thickness of 1.5 mil on a polyester sheet backing, e.g. polyethylene terephthalate provides a HMPSA having a rolling ball tack of less than 10 cm and a Polyken probe tack greater than 400 gm/cm$^2$.

DETAILED DESCRIPTION OF THE INVENTION

In practicing this invention to produce the novel petroleum resin which has been found to provide tackification in binary blends to saturated midblock thermoplastic elastomers, the feedstock composition, polymerization conditions and hydrogenation conditions are critical if one is to obtain the fully saturated resin possessing the requisite molecular weight, softening point and preferred glass transition temperature properties.

FEEDSTOCK

The feedstock is obtained as a $C_5$-$C_6$ fraction from a steam cracked naphtha or light refinery streams with a boiling range of from 20° C. to 80° C. and a major proportion of piperylene and usefully 2-methyl butenes as the polymerizable content of said fraction. This $C_5$-$C_6$ fraction can be usefully adjusted in a suitable way to provide a weight ratio of total diolefin to monoolefin of from 0.7 to 1.0; however, when other less reactive monoolefins are present in the feedstock this latter ratio range is extended without prejudice to the product resin to from 0.5 to 1.0.

The diolefins as hereabove referred to are those represented by cyclopentadiene, cis and trans 1,3-pentadiene and isoprene. The total monoolefins include both five and six carbon hydrocarbons such as 2-methyl-1-butene, 2-methyl-2-butene, cyclopentene, 1-pentene, cis and trans-2-pentene, trans-4-methyl pentene, 2-methyl pentene and 1-hexene. The total 2-methyl butenes include both isomers of the above butenes. The total diolefins include all five and six carbon hydrocarbons such as 1,3-cyclopentadiene.

The above said adjustment of weight ratio between the diolefins and monoolefins or 2-methyl butenes may be effected by any of the customary procedures without any particular restriction, such as, for example, removal of isoprene by precise fractional distillation; adjustment of the concentration of diolefins and monoolefins by extractive or azeotropic distillation; removal of diolefins by thermal dimerization as described in U.S. Pat. No. 4,358,574; and addition of a $C_5$ fraction which has been deprived of diolefins (i.e. so called spent $C_5$ fraction). A typical feedstock composition is set forth hereafter in Example 1.

Polymerization

In carrying out the polymerization reaction, the hydrocarbon mixture is brought into contact with the anhydrous aluminum chloride catalyst. Generally, the catalyst is used in particulate form. Generally a particle size in the range of from about 5 to about 200 mesh size is used although larger or smaller particles can be used. The amount of catalyst used ranges from 1.0 to 2.0, preferably 1.5, weight percent. The catalyst may be added to the olefinic hydrocarbon mixture or the hydrocarbon mixture may be added to the catalyst. The reaction can be conducted continuously or by batch process techniques generally known to those skilled in the art.

The reaction whould also be carried out at a pressure of from 10 to 80, preferably 20, psi. Since the number average molecular weight of the product polymerizate is important to the invention, the other reaction parameters of: temperature which ranges from 30° C. to 100° C., more usefully from 50° C. to 75° C., preferably about 60° C.; and, time of polymerization which ranges from 0.5 to 2.0 hours, preferably 1 hour, should be controlled.

The reaction is conveniently carried out in the presence of a diluent because the reaction is usually exothermic and the resulting product is viscous. However, with adequate mixing and cooling, the temperature can be controlled and reaction conducted with only sufficient diluent to maintain good transfer out of the heat of polymerization. The diluent may be introduced as a component of the feedstock for resinification, e.g. in the example alkanes are introduced as a significant (about 35%) component of the piperylene rich feedstream. Various other diluents which are inert in that they do not enter into the polymerization reaction may be used. Representative examples of inert diluents are aliphatic hydrocarbons such as pentane, hexane and heptane, aromatic hydrocarbons such as toluene and benzene, and unreacted residual hydrocarbons from the reaction.

UNSATURATED PRECURSOR RESINS

The resulting polymeric product can be considered a synthetic hydrocarbon resin which has in its backbone structure a high degree of substituted 1,4-cyclohexene and cyclohexane type of rings. Such rings come about from the backbitting which occurs when a feedstock containing a large percentage of 1,3-dienes (piperylenes) is polymerized cationically with a Lewis acid such as aluminum chloride and utilized 2-methylbutenes for chain transfer or termination. The polymerizate product is characterized by a number average molecular weight (Mn) of from 400 to 800, and softening point ranging from 75°–95° C.

HYDROGENATION

The hydrogenation can be any conventional means which does not affect the molecular weight of the precursor resin, as for example by hydrogenation over a massive nickel catalyst at 200 to 1200 psig hydrogen pressure at 230° C. to 270° C. for a suitable period. Hydrogenation of the resin for purposes of this invention is realized when the resin is fully saturated (all the C to C double bonds are hydrogenated) and the softening point and glass transition temperature are within the desired range, i.e. 40° to 70° C. and less than 45° C., respectively. This level of hydrogenation also destroys the color bodies prsent in the unsaturated resin.

All of the hydrogenations of the disclosure were performed in a one gallon stainless steel (316) batch autoclave. The catalyst was Harshaw Ni 3266 E ⅛" extrudates which is a massive Ni catalyst. It was contained in a cylindrical basket made of a heavy wire screen which fits snuggly against the inner wall of the reactor and had an annulus slightly larger than the turbine blade agitator which was located in the center of this annulus. The catalyst was activated according to the manufacturer's preferred procedure. The hydrogenation procedure was to charge the reactor with 300 grams of the resin dissolved in enough n-heptane to make ½ gallon of solution at room temperature. The reactor was pressured to 50 psig with $H_2$ and then heated as rapidly as possible to the desired temperature but care was taken to ensure this temperature was never exceeded by more than 3° C. The heating time to 200° C. was approximately 2 hours. The reactor was then pressured to 900 psig with hydrogen and maintained at this pressure for the duration of the run which was normally 4 hours.

SATURATED RESIN TACKIFIER

The resin of the invention is the fully saturated precursor resin discussed above which upon hydrogenation produces a fully saturated petroleum resin possessing in its backbone structure a preponderance of substituted cyclohexane rings and having a number average molecular weight ($\overline{M}n$) of from 400 to 800, a softening point of 40° to 70° C., a glass transition temperature (Tg) of less than 45° C. and when admixed at the level of 60% with Kraton ® G 1657, a saturated midblock thermoplastic elastomer, provides a HMPSA having a rolling ball tack of less than 10 cm and a Polyken probe tack greater than 400 gm/$cm^2$. The resin of the invention is an excellent tackifier for saturated mid block thermoplastic elastomers as represented by styrene-ethylene/butene-styrene block polymers such as Shell Chemical Company's Kraton ® G 1657.

SATURATED MIDBLOCK THERMOPLASTIC ELASTOMERS

The saturated midblock thermoplastic elastomers usefully tackified by the resin of this invention are commercially exemplified by ABA type block copolymers of (A) polystyrene and (B) a polydiene which is typically selected from the group consisting of polybutadiene and polyisoprene wherein the unsaturated midblock of either polybutadiene or polyisoprene is hydrogenated to yield a saturated midblock segment. Commercially available hydrogenated block copolymers are manufactured by Shell Chemical Company and sold under the tradename: Kraton ® G. An extensive discussion of said block copolymers and formulation of them into adhesives can be found in Rubber Chemistry and Technology, 55, pages 208–218 (1981). The block copolymers with the saturated midblock segment have an Mn as measured by GPC of about 25,000 to about 300,000, more preferably about 30,000 to about 200,000, and most preferably about 50,000 to about 150,000.

HOT MELT PRESSURE SENSITIVE ADHESIVE BLEND

The HMPSA is generally a blend of the tackifier petroleum resin described herein in amounts ranging from 100 to 180, preferably 140 to 180, optimally about 160 parts of resin with 100 parts of the saturated midblock thermoplastic elastomer formulation generally includes a phenolic antioxidant such as Irganox ® 1010 in amounts ranging from 1 to 5, generally 2, weight percent based on the total amount of of the resin-copolymer components. The HMPSA blends of the invention can also include other tackifiers such as another petroleum resin, diluents and plasticizers and other elastic polymers in order to make minor adjustments in the adhesive properties of the HMPSA.

As indicated a useful approach to defining the tackifying resin of the invention is to measure the adhesive properties of a blend of 150 weight parts tackifying resin (60% of the total blend) with 100 weight parts of a saturated midblock thermoplastic elastomer such as Kraton ® G 1657. Such a blend provides a HMPSA having a rolling ball tack of less than 10 cm., usually 2 to 6 cm. and a Polyken probe tack of greater than 400, preferably at least 600, gm./$cm.^2$ The advantages of the HMPSA formulations of the present invention can be more readily appreciated by reference to the following examples.

EXAMPLE 1

As an Example of this invention a precursor petroleum resin was prepared by polymerizing a $C_5$ to $C_6$ fraction having a boiling point of 22° C. to 65° C. having the composition shown in Table I.

TABLE I

| Typical Composition of Hydrocarbon Fraction | |
|---|---|
| 2-Methylbutane | 29% by weight |
| 2-Methyl-1-butene | 4% by weight |
| Isoprene | 1% by weight |
| 2-Methyl-2-Butene | 19% by weight |
| Cyclopentadiene | 1% by weight |
| Cis/trans 1,3-pentadiene | 20% by weight |
| Cyclopentene | 7% by weight |
| Other $C_5/C_6$ Olefins | 13% by weight |
| Other Alkanes | 7% by weight |
| Total diolefins to 2-methyl butenes (wt. ratio) = | 0.96 |
| Total cyclic diolefins to monoolefins (wt. ratio) = | 0.02 |
| Total diolefins to mono-olefins (wt. ratio) = | 0.51 |

Four hundred grams of the fraction shown on Table I were fed into a reactor containing 6.0 g of anhydrous $AlCl_3$ dispersed in 10 ml of benzene and equipped with a stirrer, a condenser and a thermometer. As the addition of the feed to the catalyst started, the temperature of the reaction increased slowly until a maximum temperature of 68° C. was achieved. The addition of the feed usually takes place during 30 minutes followed by 30 minutes of further reaction.

At the end of the 1 hour reaction time the reaction was quenched by adding 200 ml of distilled water. The total reaction contents were placed in a separatory funnel and washed twice with 2 liters of a 3 to 1 mixture of water to isopropanol.

The now clean dilute polymerizate was placed in a two-necked flask and heated under nitrogen to 195° C. to volatilize the unreacted olefins and alkanes leaving behind a mixture of oligomers and the hydrocarbon resin. This mixture was further stripped by steam to separate the oligomers from the resin. This separation was carried out at 250° C. until 250 ml of steam condensate were collected in the received flask leaving behind 140 g of precursor resin having the properties outlined in Table IA.

TABLE IA

| Typical Composition of Hydrocarbon Fraction Serving as the Precursor Resin | |
|---|---|
| Softening Point (ring and ball method ASTM E-26) | 80° C. |
| Cloud Point (20/40/40) (Wax/Resin/EVA) | 60° C. |
| Gardner Color (50 wt. % resin in toluene) | 6 |
| Mw | 890 |

TABLE IA-continued

Typical Composition of Hydrocarbon Fraction Serving as the Precursor Resin

| | |
|---|---|
| $\overline{Mn}$ | 560 |
| $\overline{Mw}/\overline{Mn}$ | 1.6 |
| Tg (glass transition temperature as measured by thermo mechanical analysis) | 53° C. |

300 grams of the precursor resin was dissolved in 1.5 to 2 liters of hexane. The solution was placed in a 1 gallon batch hydrogenation reactor and therein the resin was hydrogenated over a massive Ni catalyst (Harshaw 3266) at 1,000 psig hydrogen pressure at 190° C. After approximately 5 hours at the above conditions, the reactor was drained and the hexane was removed by vacuum/steam stripping. The resulting fully saturated resin was water-white and had the following properties outlined in Table IB.

TABLE IB

Composition of Saturated Resin

| | |
|---|---|
| Softening Point (ring and ball method ASTM E-26) | 59° C. |
| Cloud Point (20/40/40) | 60° C. |
| Gardner Color (50 wt. % resin in toluene) | 1 |
| $\overline{Mw}$ | 890 |
| $\overline{Mn}$ | 560 |
| $\overline{Mw}/\overline{Mn}$ | 1.6 |
| Tg (glass transition temperature as measured thermo mechanical analysis) | 36° C. |
| Tg (as measured by differential scanning calorimetry using the referenced DuPont apparatus) | 20° C. |

The above data show that the hydrogenation lowered the softening point and Tg of the unsaturated resin and provided a water-white, fully saturated tackifying resin of the invention without affecting the molecular weights.

EXAMPLES 2–5

Four HMPSA formulations were each prepared by dissolving by agitation 100 weight units of Kraton ® G block copolymer purchased from Shell Chemical Company, Houston, Tex. 2 weight units of a commercial phenolic antioxidant Irganox ®1010 purchased from Ciba-Geigy Corporation, Summit, N.J. and the indicated weight units of the saturated resin of the invention for Examples 2–4 and a commercial tackifying resin for Example 5 in enough toluene to make a 50 wt% solution. The adhesive was cast from the test formulation onto a 1.5 mil thick polyethylene terephthalate (Mylar ®) film to provide a dry adhesive film thickness of 1.5 mil. The results are shown in Table II.

TABLE II

PRESSURE SENSITIVE ADHESIVE FORMULATION RESULTS

| Formulation PHR* | Example 2 | Example 3 | Example 4 | Example 5 |
|---|---|---|---|---|
| Kraton ® G (1657)** | 100 | 100 | 100 | 100 |
| Table IB Resin | 80 | 120 | 160 | 80*** |
| Antioxidant | 2 | 2 | 2 | 2 |
| Test Results | | | | |
| Rolling ball tack, cm (PSTC Test #6) Initial | 6 | 8 | 8 | 14 |
| 180° C. Peel, lb/inch (PSTC #1) Initial | 2.6 | 3.2 | 3.8 | 2.6 |
| 90° Quick Stick, lb/inch (PSTC Test #1A) | 1.4 | 2.1 | 2.7 | 1.2 |
| Initial Polyken Tack, g/cm² (ASTMD-2979) Initial | 870 | 1380 | 1543 | 650 |

*PHR refers to "parts hundred rubber" which herein refers to copolymer as the rubber.
**Kraton ® G (1657) is sold by Shell Chemical Company of Houston, Texas.
***Escorez Resin 5380 sold by Exxon Chemical Americas, Houston, Texas.
PSTC Tests 1, 1A and 6 are published by Pressure Sensitive Tape Council, Glenville, ILL 60025.
ASTMD-2979 refers to the test specified by American Society for Testing Materials.

These data clearly show that the tackifying resin of the invention is a much superior tackifier for Kraton ® G 1657 and a commercially available tackifying resin. At twice the loading, 160 phr vs. 80 phr, the new tackifying resin shows superior properties in all categories. In addition, at 160 phr the viscosity of the formulation is low enough so that no processing oil would be needed for good application rates.

Where the HMPSA of the invention requires the incorporation of a solvent to facilitate its coating or spraying onto the surfaces to be bonded it is preferred to utilize naphtha as the solvent to provide a concentration level of 35 to about 55 weight percent of Elastomer and saturated petroleum resin dissolved in said solvent, said weight percent based on the total weight of the solution.

This invention in its broader aspect is not limited to the specific details shown and described, and departures may be made from such details without departing from the principles of the invention and without sacrificing its chief advantages.

What is claimed is:

1. A fully saturated aliphatic petroleum resin possessing in its backbone structure a preponderance of substituted cyclohexane rings and having a number average molecular weight of ($\overline{Mn}$) of 400 to 800, a softening point of 40° C. to 70° C., a glass transition temperature (Tg) of less than 45° C. and, when admixed at the total weight level of 60% with a polystyrene-hydrogenated polydiene-polystyrene saturated midblock thermoplastic elastomer of $\overline{Mn}$ from about 30,000 to about 200,000 as measured by GPC, provides a HMPSA having a rolling ball tack of less than 10 cm and a Polyken probe tack greater than 400 gm/cm², said resin being produced by the Friedel-Crafts polymerization of a $C_5$-$C_6$ fraction from steam cracked naphtha or light refinery streams having a boiling range from 20° C. to 80° C., said resin having a major proportion of the polymerizable content comprising piperylene and 2-methyl-2-butene or similar branched olefins.

2. The petroleum resin according to claim 1 having a glass transition temperature of from 10° C. to 30° C. and softening point in the range of 50° C. to 65° C.

3. The petroleum resin according to claim 2 wherein said admixture exhibits a rolling ball tack of from 2 to 6 cm. and a Polyken probe tack of at least 600.

4. A hot melt pressure sensitive adhesive (HMPSA) formulation comprising (a) a saturated midblock thermoplastic elastomer and (b) about 100 to 180 parts by weight per 100 parts by weight of said elastomer of a fully saturated aliphatic petroleum resin possessing in its backbone structure a preponderance of substituted cyclohexane rings and having a number average molecular weight ($\overline{M}n$) of 400 to 800, a softening point of 40° C. to 70° C., a glass transition temperature (Tg) of less than 45° C. and, when admixed at the total weight level of 60% with a polystyrene-hydrogenated polydiene-polystyrene saturated midblock thermoplastic elastomer of $\overline{M}n$ from about 30,000 to about 200,000 as measured by GPC, provides a HMPSA having a rolling ball tack of less than 10 cm and a Polyken probe tack greater than 400 gm/cm², said resin being produced by the Friedel-Crafts polymerization of a $C_5$-$C_6$ fraction from steam cracked naphtha or light refinery streams having a boiling range from 20° C. to 80° C., said resin having a major proportion of the polymerizable content comprising piperylene and 2-methyl-2-butene or similar branched olefins.

5. A HMPSA formulation according to claim 4 containing up to 2 weight percent of an antioxidant.

6. A HMPSA formulation according to claim 4 wherein said elastomer is a block copolymer of styrene and hydrogenated polydiene of $\overline{M}n$ from about 30,000 to about 200,000 as measured by GPC.

7. A pressure sensitive adhesive formulation according to claim 6 containing a naphtha solvent, said elastomer and saturated petroleum resin being dissolved in said solvent at a concentration level of 35 to about 55 weight percent based on the total weight of said composition.

* * * * *